(12) United States Patent
Wanat et al.

(10) Patent No.: US 6,198,078 B1
(45) Date of Patent: Mar. 6, 2001

(54) TEMPERATURE CONTROL FOR A TOASTER OVEN

(75) Inventors: David Wanat, Meriden; Arthur J. Sansone, Stamford; Theodore B. Mulle, New Milford, all of CT (US)

(73) Assignee: Conair Corporation, Stamford, CT (US)

( * ) Notice: Subject to any disclaimer, the term of this patent is extended or adjusted under 35 U.S.C. 154(b) by 0 days.

(21) Appl. No.: 09/481,066

(22) Filed: Jan. 11, 2000

(51) Int. Cl.[7] .................................................... H05B 1/02
(52) U.S. Cl. ......................... 219/492; 219/497; 219/518; 219/501; 219/514; 99/328; 99/329 R
(58) Field of Search ...................................... 219/492, 497, 219/493, 501, 505, 508, 518, 514, 494; 99/328, 329 R, 329 RT

(56) References Cited

U.S. PATENT DOCUMENTS

| | | |
|---|---|---|
| 4,170,932 * 10/1979 | Lalancette | 219/444 |
| 4,742,246 * 5/1988 | Mori | 219/492 |
| 4,978,838 * 12/1990 | Sanjuan | 219/497 |

* cited by examiner

Primary Examiner—Mark Paschall
(74) Attorney, Agent, or Firm—Ohlandt, Greeley, Ruggiero & Perle.

(57) ABSTRACT

A toaster broiler oven with an NTC temperature probe located within the oven chamber and a controller that controls the heater of the oven in a thermostat operation for non-toasting modes and in a variable toasting interval length operation in the toasting mode. When the toaster start switch is activated in the toast mode, the controller determines if the oven chamber temperature is greater than a predetermined temperature, such as room temperature. If not, a first toast interval is selected. If so, a second shorter toast interval is selected. The length of the second interval is chosen so that the toaster oven consistently produces toast of a selected color from one toast cycle to the next, regardless of the elapsed time between consecutive toast cycles.

8 Claims, 2 Drawing Sheets

US 6,198,078 B1

TEMPERATURE CONTROL FOR A TOASTER OVEN

FIELD OF THE INVENTION

This invention relates to a toaster oven broiler and, in particular, to a toaster oven broiler with a temperature control and to a method of toasting a bread product.

DESCRIPTION OF THE ART

It is known in the toaster oven broiler art to use a mechanical thermostat mounted either directly outside of a wall of the cooking chamber or to a small heat pipe that conducts heat from the cooking chamber. Both of these constructions are subject to delayed operation and response because of the time required to conduct heat through the wall of the cooking chamber. The thermostat operation is generally limited to oven operation in non-toasting modes, such as baking, broiling and the like. For the toasting mode, a simple mechanical timer that, when moved from zero to a particular toast color, energizes the oven heater at full power until the timer returns to zero. Mechanical timers are not very accurate and, over time, drift. This causes, for example, the oven toaster to toast a bread product as medium, dark and burnt for color selections of light, medium and dark, respectively.

An object of the present invention is to provide a toaster oven with an accurate electrical control that automatically adjusts toasting time as a function of oven temperature.

SUMMARY OF THE INVENTION

A toaster oven according to the invention includes a heater that, when energized, heats a toasting chamber. A temperature sensor is disposed in the toasting chamber and provides an electrical signal signifying the temperature therein. A controller responds to the electrical signal to determine the oven temperature. If the oven temperature is approximately a predetermined temperature, such as room temperature, the controller causes the heater to be energized for a first toasting interval. If the toasting chamber temperature is at a greater temperature, the controller causes the heater to be energized for a second toasting interval that is shorter than the first toasting interval. Thus, if the toasting chamber is at room temperature, the first interval is selected and is a normal toast time from a cold start. On the other hand, if the toasting chamber is at a warmer temperature, the second shorter toasting interval is selected. This results in toast that has the same color over consecutive toast cycles, regardless of how much time elapses between the cycles. The second shorter toasting interval is in the range of about 30% to about 42% of the first toasting interval. The toaster oven is programmed for a maximum temperature so that the oven cannot produce an excessive level of heat.

The toaster oven of the invention may also include a color control for signifying at least two different toast colors. The controller uses different time lengths for the first toasting interval for the two different toast colors. Preferably, the temperature sensor is a negative temperature coefficient device with a tolerance of ±15° F.

The method of toasting a bread product according to the invention monitors the temperature in the toaster chamber. If the chamber temperature is approximately the predetermined temperature, the heater is energized for a first toasting interval. If the chamber temperature is higher than the predetermined temperature, the heater is energized for a second toasting interval that is shorter than the first toasting interval.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DESCRIPTION OF THE INVENTION

Figure 1:
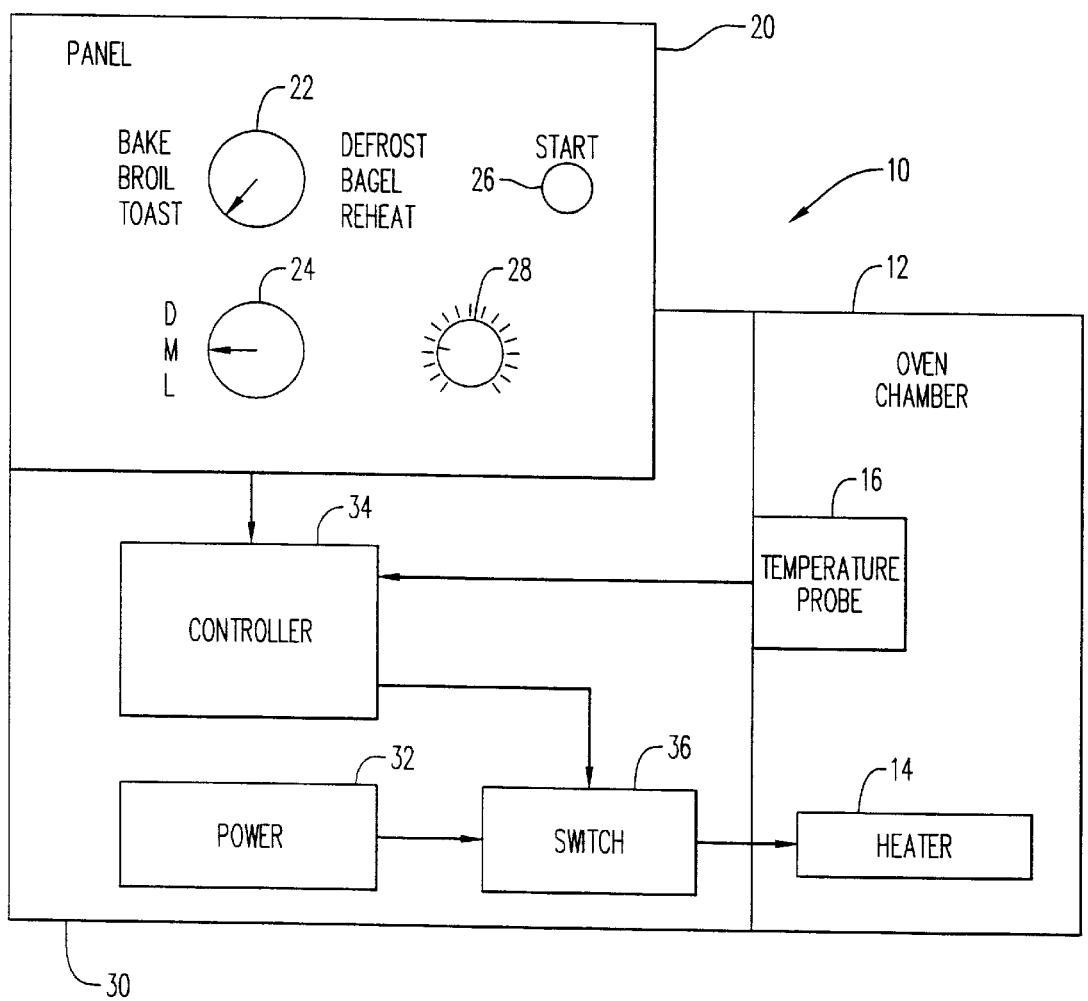
FIG. 1 is a schematic diagram of the toaster oven of the present invention.

Referring to FIG. 1, a toaster oven 10 includes an oven chamber 12, a panel 20 and a control area 30. Oven chamber 12 includes a heater 14 and a temperature probe or sensor 16. When energized, heater 14 heats oven chamber 12 to the temperature necessary for a cooking operation. Heater 14 may be any suitable heater, such as an electrical resistance heater. Temperature probe 16 is located within oven chamber 12 and is preferably a negative temperature coefficient device with a tolerance of ±15° F.

Panel 20 includes a mode selector 22, a toast color selector 24, a start switch 26 and a temperature selector 28. Mode selector 22 may be any suitable selector, such as a rotary selector that is operable to select from a number of operating modes for toaster oven 10. For example, the operating modes may include bake, broil, toast, defrost, bagel and reheat. Toast color selector 24 may be any suitable selector, such as a rotary selector that is operable to select from two or more toast colors. For example, toast color selector 24 is shown in FIG. 1 with the capability to select from light (L), medium (M) and dark (D) colors.

Temperature selector 28 may be any suitable selector that is capable of selecting a cook temperature. Temperature selector 28 is generally operable in the non-toasting modes to select a desired cook temperature. Start switch 26 is operable to begin a cooking cycle, for example a toast cycle.

Control area 30 includes an electrical power unit 32, a controller 34 and a switch 36. Electrical power unit 32 may be any electrical power unit that receives a.c. power from a conventional a.c. service and provides operating power to electrical heater 14 and d.c. operating power to controller 34. Controller 34 receives, as inputs, the mode selection of mode selector 22, the toast color selection of toast color selector 24, the temperature selection of temperature selector 28, the start signal command of start switch 26 and the oven chamber temperature from temperature probe 16. Controller 34 responds to these inputs according to cooking instructions stored therein to operate switch 36 to apply electrical power to heater 14. Switch 36 may be any suitable switch that is controllable to connect and disconnect electrical power from power unit 32 to heater 14. For example, switch 36 may suitably be a relay or a power semiconductor switch.

Controller 34 may be any suitable controller that has a microprocessor, a memory and analog to digital conversion capability.

When mode selector 22 is operated to select a non-toasting mode, such as bake, controller 34 operates switch 36 to maintain the oven chamber temperature substantially constant. For example, when the oven temperature sensed by temperature probe 16 is less than a selected temperature, controller 34 keeps switch 36 turned on to supply power to heater 14. On the other hand, when the oven temperature sensed by temperature is greater than the selected temperature, controller 34 turns switch 36 off, thereby interrupting the flow of operating power to heater 14. Oven chamber 12 then cools until the oven temperature becomes less than the selected temperature and controller 34 turns switch 36 on to again supply electrical power to heater 14. This oscillatory thermostat operation continues until the cook operation is finished.

Figure 2:
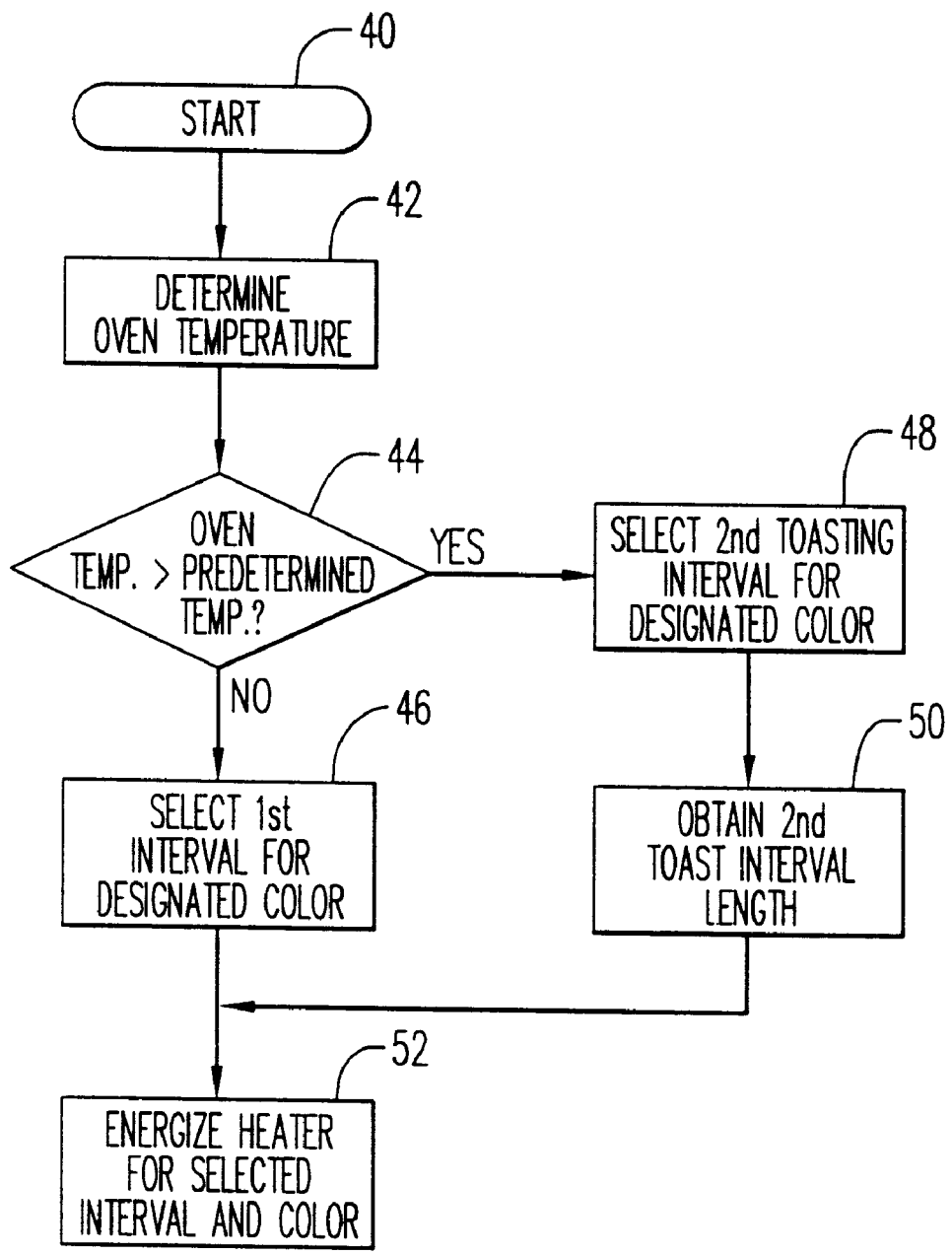
FIG. 2 is a flow diagram of the operation of the controller of the toaster oven of FIG. 1.

For toast mode operation, controller 34 precisely controls the toasting interval according to the toast color selected by toast color selector 24 and the oven chamber temperature sensed by temperature probe 16. Referring to FIG. 2, a toast cycle begins at step 40 with the actuation of start switch 26. At step 42, controller 34 determines the oven chamber temperature sensed by temperature probe 16 by converting the temperature probe signal to a temperature value. At step 44, controller 34 determines if the oven chamber temperature is greater than a predetermined temperature, such as room temperature. If not, controller 34 at step 46 selects a first interval for the color designated toast color selector 24. The interval lengths of the first interval for the selectable colors may suitably be preset in the memory of controller 34 at factory assembly time.

If step 44 determines that the oven chamber temperature is greater than the predetermined temperature, step 48 selects a second toasting interval for the designated color. Step 50 then obtains the second toast interval length. The length of the second toasting interval is shorter than the length of the first toasting interval by an amount that is proportional to the actual oven temperature. Preferably, the length of the second toasting interval is in the range of about 30% to about 42% of the interval length of the first interval for the selected toast color. The second interval length may either be computed or obtained from a buffer in the memory of controller 34 at step 50.

The next step 52 operates controller 34 to turn switch 36 on for the selected interval to heat oven chamber 12 and thereby toast a bread product. By locating temperature probe 16 within oven chamber 12 and using controller 34 to operate switch 34, toaster oven 10 can consistently provide toast of the proper color from one toast cycle to the next, regardless of the elapsed times between toast cycles.

The present invention having been thus described with particular reference to the preferred forms thereof, it will be obvious that various changes and modifications may be made therein without departing from the spirit and scope of the present invention as defined in the appended claims.

What is claimed is:

1. A toaster oven comprising:

a toasting chamber;

a heater that, when energized, heats the toasting chamber;

a temperature sensor that provides an electrical signal signifying the temperature of the toasting oven; and a controller that responds to the electrical signal (a) to determine if the chamber temperature is approximately a predetermined temperature, (b) if yes, to energize the heater for a first toasting interval, and, (c) if the chamber temperature is greater than about the predetermined temperature, to energize the heater for a second toasting interval shorter than the first toasting interval.

2. The toaster oven of claim 1, wherein the predetermined temperature corresponds to about room temperature, and wherein the second toasting interval is in the range of about 30% to about 42% of the first toasting interval.

3. The toaster oven of claim 2, further comprising a start control, and wherein the controller samples the electrical signal in response to actuation of the start control and determines the oven temperature; and wherein the length of the second interval is proportional to the toasting chamber temperature.

4. The toaster oven of claim 3, further comprising a toast color control for signifying at least first and second colors; and wherein the controller uses different toasting interval lengths for the at least first and second colors.

5. The toaster oven of claim 4, wherein the temperature sensor is a negative temperature coefficient device that is disposed in the toasting chamber.

6. A method of toasting a bread product in a toaster oven that has a toasting chamber and a heater that, when energized, provides toasting heat in the toasting chamber, said method comprising:

(a) monitoring the temperature in the toaster oven;

(b) if the temperature monitored by step (a) is approximately a predetermined temperature, energizing the heater for a first toasting interval; and (c) if the temperature monitored by step (a) is higher than about the predetermined temperature, energizing the heater for a second toasting interval that is shorter than the first toasting interval.

7. The method of claim 6, wherein the second toasting interval is in the range of about 32% to about 40% of the first toasting interval.

8. The method of claim 7, wherein the toaster oven further includes a toast color control for signifying at least first and second colors, and wherein steps (b) and (c) use different interval lengths of the first interval for the at least first and second colors.

* * * * *